United States Patent

[11] 3,542,099

| [72] | Inventor | Duane M. Gibson |
| | | Milwaukee, Oregon |
| [21] | Appl. No. | 736,907 |
| [22] | Filed | May 13, 1968 |
| [45] | Patented | Nov. 24, 1970 |
| [73] | Assignee | Omark Industries, Inc. |
| | | Portland, Oregon |
| | | a corporation of Oregon |

[54] TREE HARVESTERS
35 Claims, 21 Drawing Figs.

[52] U.S. Cl. .................................................. 144/3,
144/34, 144/309
[51] Int. Cl. .................................................. A01g 23/02
[50] Field of Search.......................................... 144/2—21,
3—4, 34(1—5), 309—(34)

[56] References Cited
UNITED STATES PATENTS
3,308,861  3/1967  Hamilton.......................... 144/3

Primary Examiner—Gerald A. Dost
Attorney—Buckhorn, Blore, Klarquist and Sparkman ABSTRACT: Tree harvesters 10, 210 and 310 have headers 12, 212 and 312 carried by tractors and each is movable into a felling position in which V-groove, ribbed rollers engage the tree and, with pressing and guiding limbers, encircle the tree to hold the tree. A chain saw on the header then fells the tree, the header is driven up the tree to grip it at its center of gravity, the header lays the tree in a horizontal position, and the header pulls the tree therethrough to limb the tree and bucks the tree.

Patented Nov. 24, 1970
3,542,099
Sheet 1 of 5
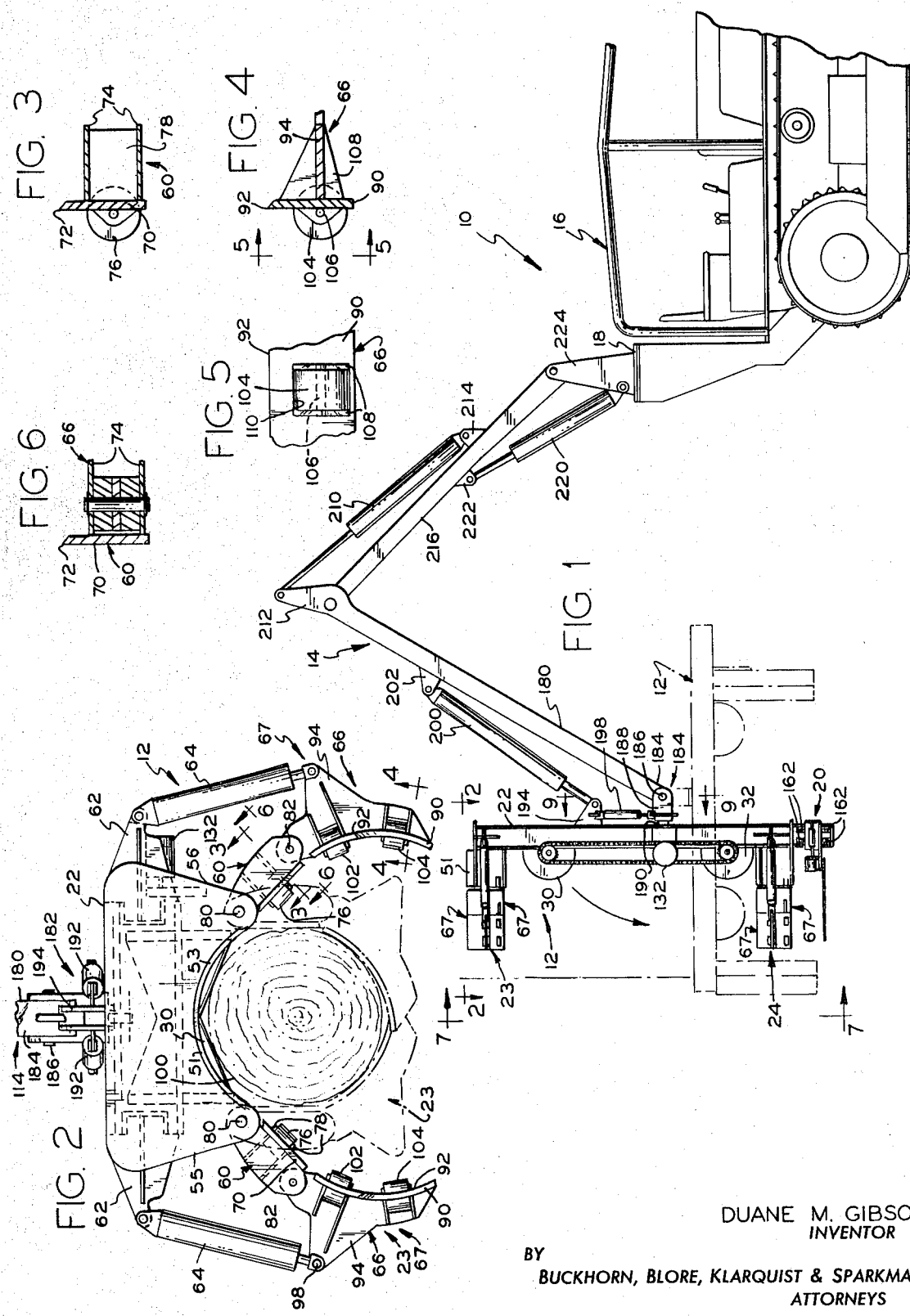
DUANE M. GIBSON
INVENTOR
BY
BUCKHORN, BLORE, KLARQUIST & SPARKMAN
ATTORNEYS

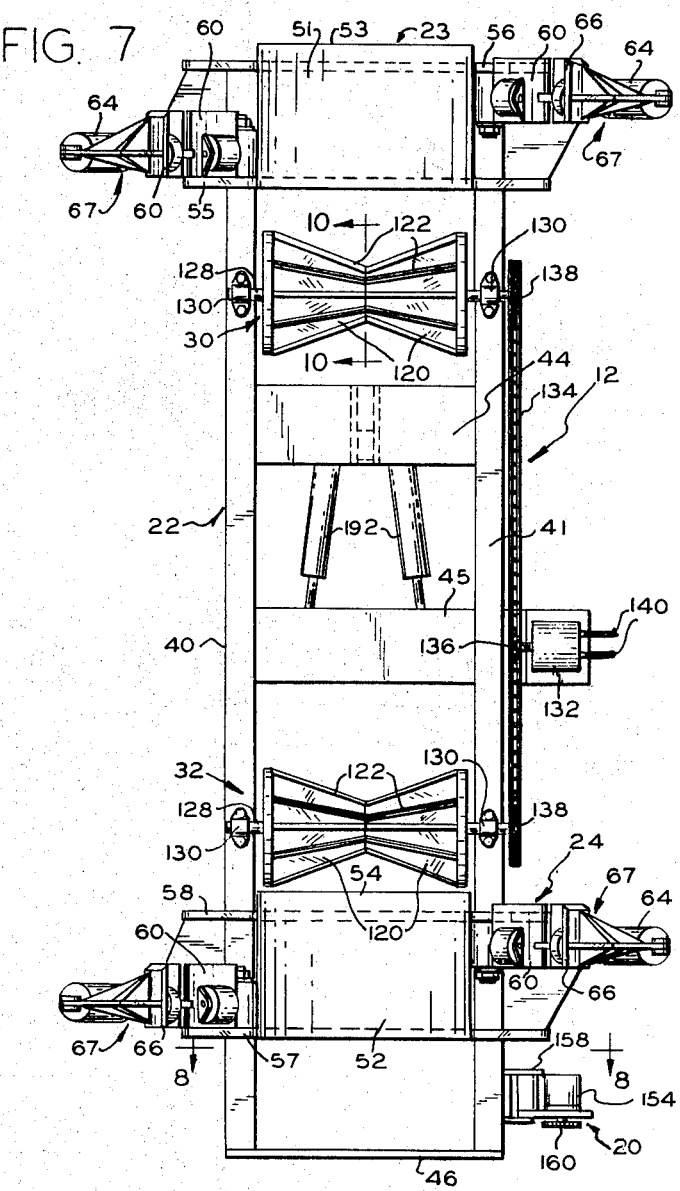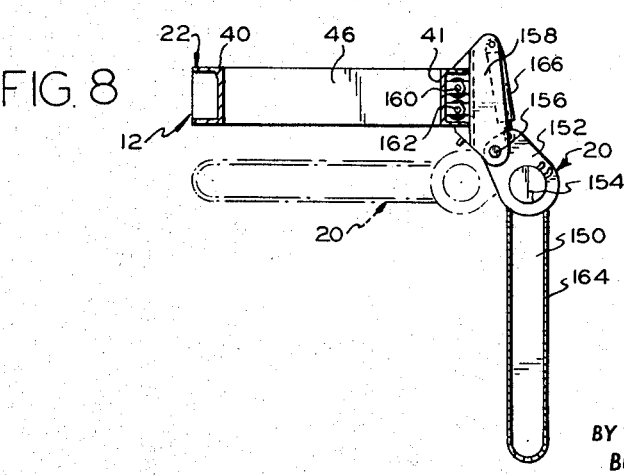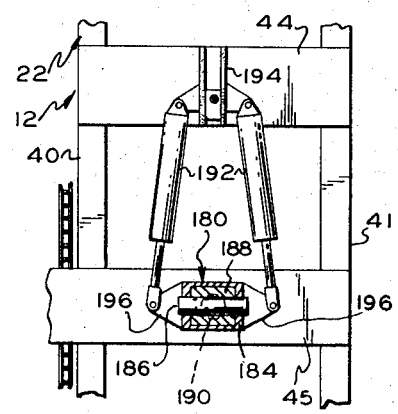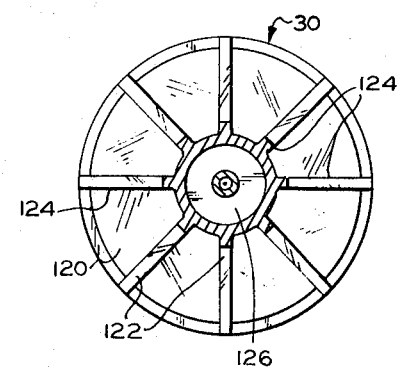

Patented Nov. 24, 1970
3,542,099
Sheet 3 of 5
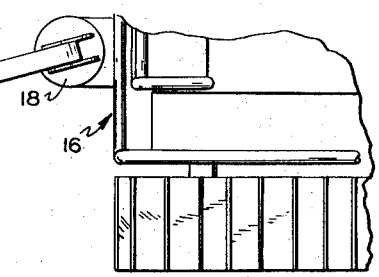
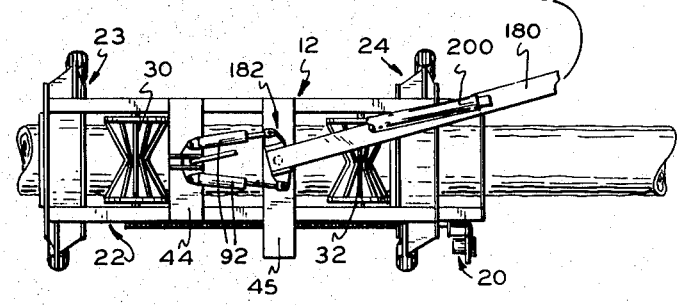
FIG. 11
FIG. 12
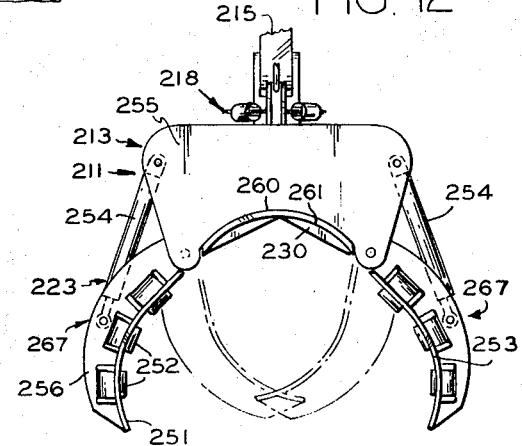
FIG. 17
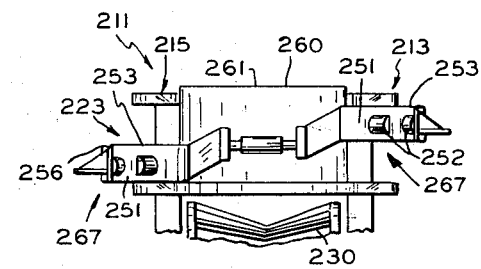
FIG. 13
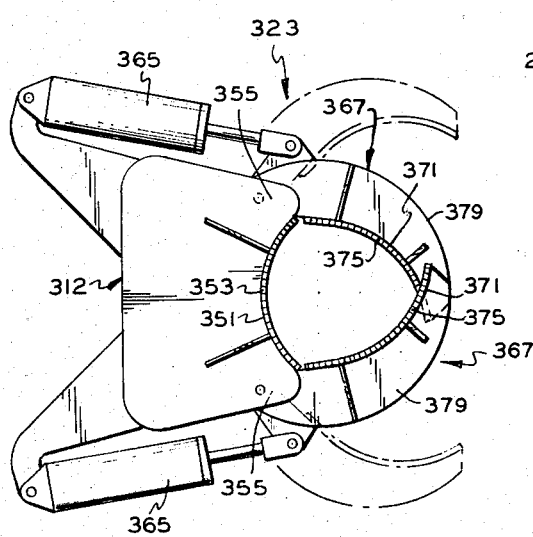
DUANE M. GIBSON
INVENTOR
BY
BUCKHORN, BLORE, KLARQUIST & SPARKMAN
ATTORNEYS Patented Nov. 24, 1970
3,542,099
Sheet 4 of 5
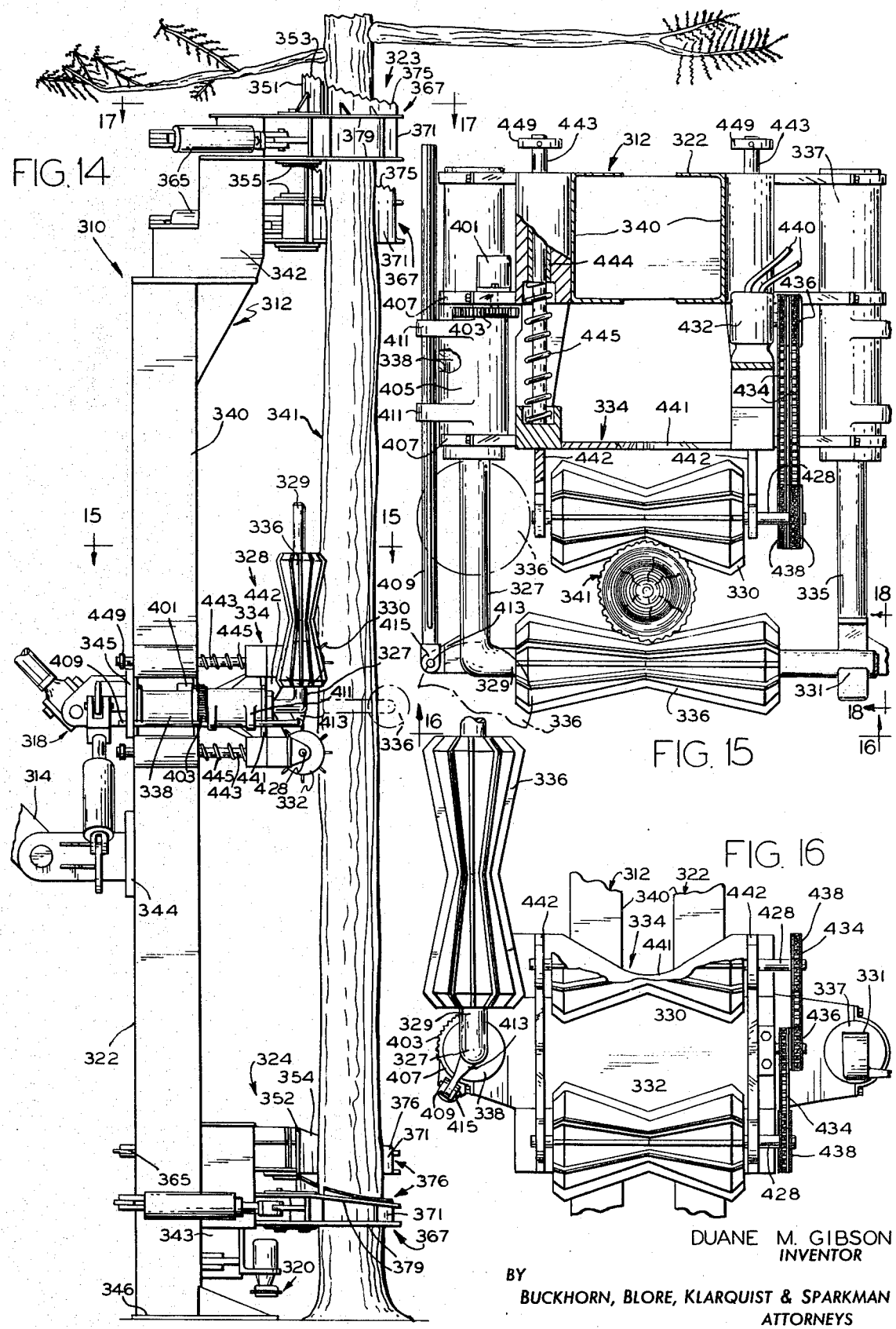
DUANE M. GIBSON
INVENTOR
BY
BUCKHORN, BLORE, KLARQUIST & SPARKMAN
ATTORNEYS

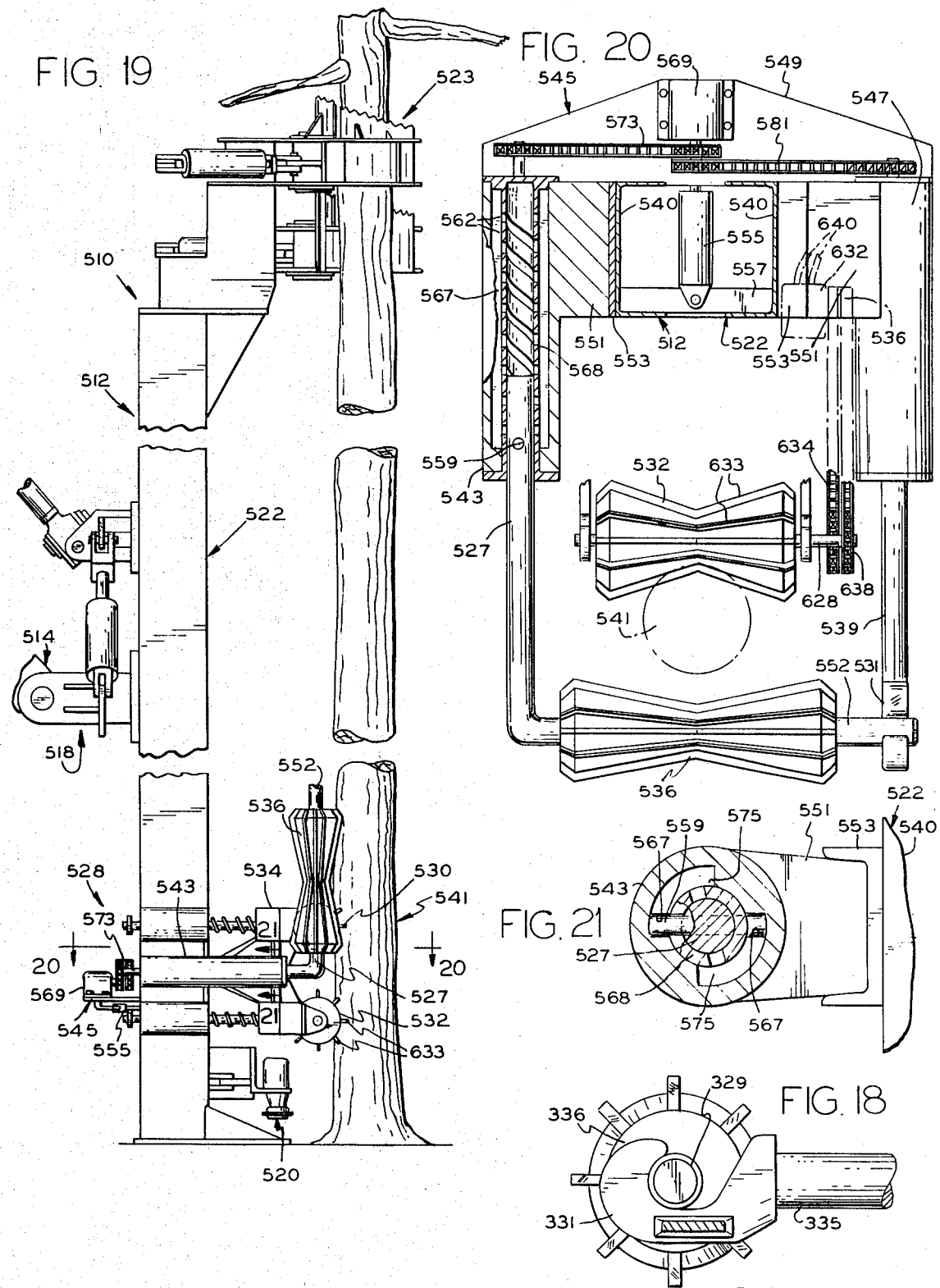

TREE HARVESTERS

DESCRIPTION

This invention relates to improved tree harvesters, and more particularly to tree harvesters for felling, limbing and bucking trees.

An object of the invention is to provide new and improved tree harvesters.

Another object of the invention is to provide tree harvesters for felling, limbing and bucking trees.

A further object of the invention is to provide a tree harvester having a header adapted to selectively hold a tree stationary and to pull the tree therethrough while limbing the tree.

Another object of the invention is to provide a tree harvester having a header including grooved means for engaging one side of a tree and advancing the tree there along with guiding arms having rollers and limb shears pressing the tree against the grooved means.

Another object of the invention is to provide a tree harvester having a header provided with V-groove, ribbed rolls for advancing a tree through the header, pressing means for holding the tree against the rolls and shearing means encircling the tree for limbing it as the tree is pulled through the header.

A further object of the invention is to provide a tree harvester including a header mounted on a boom and including limbing devices at its opposite ends and a pair of centrally located, driven ribbed rolls against which the trunk is pressed by a presser roll which is mounted on a pulling cylinder drive mounted for pivotal movement between an open position in which the presser roll extends along the trunk and a pressing position extending across the trunk.

The invention provides improved tree harvesters each having a header adapted to grasp a tree, sever the tree at the stump, lay the tree down, pull the tree therethrough, limb the tree as it is so pulled and buck the tree into lengths. In a tree harvester forming one specific embodiment of the invention, a header mounted on a boom of a tractor is movable between a vertical felling position and a horizontal limbing and bucking position, and has a cradle frame supporting a pair of power-driven, plural arm, V-groove, ribbed rolls and pressing and guiding limbers having shearing blades and rollers pressing the tree against the ribbed rolls, a power-positioned chain saw being mounted on one end of the cradle frame for felling and bucking. In a timber harvester forming an alternate embodiment of the invention, a header mounted directly on a tractor includes a header having a cradle frame supporting V-groove, ribbed rolls and power-driven, single-arm, pressing and guiding limbers each having a single shearing blade and rollers and pressing the tree against the ribbed rolls with a power-positioned chain saw on the cradle frame. In a tree harvester forming an alternate embodiment of the invention, presser roll means movable between an open condition and a pressing condition serves to press a tree trunk against ribbed feed rolls mounted on the central portion of a boom mounted header having encircling guiding and limbing devices at opposite ends thereof, the limbing devices preferably including toothed, spiral shearing arms adapted to encircle the tree.

In the drawings:

FIG. 1 is a fragmentary, side elevation view of a tree harvester forming one embodiment of the invention;

FIG. 2 is an enlarged, fragmentary, top plan view taken along line 2-2 OF FIG. 1;

FIG. 3 is an enlarged, fragmentary, vertical sectional view taken along line 3-3 of FIG. 2;

FIG. 4 is an enlarged, fragmentary, vertical sectional view taken along line 4-4 of FIG. 2;

FIG. 5 is an enlarged, fragmentary, front elevation view taken along line 5-5 of FIG. 4;

FIG. 6 is an enlarged, fragmentary, vertical sectional view taken along line 6-6 of FIG. 2;

FIG. 7 is an enlarged front elevation view taken along line 7-7 of FIG. 1;

FIG. 8 is an enlarged, horizontal sectional view taken along line 8-8 of FIG. 7;

FIG. 9 is an enlarged, fragmentary, vertical sectional view taken along line 9-9 of FIG. 1;

FIG. 10 is an enlarged vertical sectional view taken along line 10-10 of FIG. 7;

FIG. 11 is a fragmentary top plan view of the tree harvester of FIG. 1;

FIG. 12 is a fragmentary top plan view of a tree harvester forming an alternate embodiment of the invention;

FIG. 13 is a fragmentary front elevation view of the tree harvester of FIG. 12;

FIG. 14 is a fragmentary, side elevation view of a tree harvester forming an alternate embodiment of the invention;

FIG. 15 is an enlarged, horizontal sectional view taken along line 15-15 of FIG. 14;

FIG. 16 is an enlarged, fragmentary, side elevation view taken along line 16-16 of FIG. 15;

FIG. 17 is an enlarged, fragmentary, horizontal sectional view taken along line 17-17 of FIG. 14;

FIG. 18 is an enlarged, fragmentary side elevation view taken along line 18-18 of FIG. 15;

FIG. 19 is a fragmentary side elevation view of a tree harvester forming an alternate embodiment of the invention;

FIG. 20 is an enlarged, horizontal sectional view taken along line 20-20 of FIG. 18; and FIG. 21 is an enlarged, vertical sectional view taken along line 21-21 of FIG. 19.

Referring now in detail to the drawings, a tree harvester 10 (FIGS. 1 to 11) forming one embodiment of the invention includes a header 12 carried by an articulated boom 14 of a crawler tractor 16 mounted on the tractor for rotation about a vertical axis by a power rotated swivel structure 18. The header includes a chain saw 20 at the bottom end of a cradle frame 22 and upper and lower pressing and guiding limbers 23 and 24 adjacent upper and lower gripping and advancing ribbed rolls 30 and 32. The harvester serves to fell, limb and buck trees, long or short. The harvester moves up to a tree, the header 12 grips the tree, the chain saw then severs the tree from its stump, the header and boom lays the tree down, the header intermittently advances the tree along the header and limbs the tree as the tree is so advanced and bucks the tree between advancements of the tree along the header. If desired, instead of laying the tree down immediately after felling, the header can be advanced up the trunk to a point near the center of gravity of the tree before gripping the tree and laying the tree down.

The cradle frame 22 (FIGS. 7 and 8) includes longitudinal channel members 40 and 41 to which end cross members 42 and 43, central cross members 44 and 45 and an end plate 46 are secured by welding to form a rigid frame structure. The pressing and guiding limbers 23 and 24 include arcuate shearing plates 51 and 52 having shearing edges 53 and 54, respectively, and fixed to the cross members 42 and 43. Heavy clevislike brackets 55, 56, 57 and 58 are welded to the frame and pivotally mount four inner arms 60 of the limbing devices 23 and 24, and also have lateral projections 62 (FIG. 2) pivotally mounting hydraulic cylinders 64. The outer ends of the cylinders 64 are pivotally connected to four outer arms 66 of the limbing devices 23 and 24. Each outer arm 66 is pivotally mounted on one of the inner arms to form an articulated arm structure 67, and the arm structures are arranged in upper and lower pairs and are adapted to overlap and press the trunk of the tree against the rolls 30 and 32.

Each inner arm 60 (FIGS. 2, 3 and 6) includes a heavy shear plate 70 having a shearing edge 72 and a pair of parallel stiffening plates 74 welded to the back of the shear plate. A roller 76 is mounted by a shaft 77 journaled in alined bearing plates 78 welded to the plates 70 and 74, and projects through openings in the plate 70. A pin 80 mounts each inner arm pivotally on one of the brackets 55 to 58, and a pin 82 pivotally connects each inner arm 60 to one of the outer arms 64.

Each outer arm 64 (FIGS. 2, 4 and 5) includes an arcuate shear plate 90 having a shearing edge 92 and an arcuate stiffening plate 94 welded along the central portion of the shear plate 90 and having a projecting portion 96 pivotally secured to the cylinder 64 by a pin 98. The cylinders 64 are adapted to hold the arm structures 67 in retracted open positions illustrated by the full line positions of FIG. 2 or in closed, overlapping positions shown in broken lines in FIG. 2 pressing a tree trunk 100 against the ribbed rolls 30 and 32. Rollers 102 and 104 (FIGS. 2, 4 and 5) are mounted rotatably by shafts 106 rotatable in bearing plates 108 welded to the shear plates 90 and the stiffening plates 94 and forming gussets therefor. The rollers 102 and 104 project through openings 110 in the shear plates 90. The two articulated arm structures 67 of the pressing and guiding limber 23 are offset from each other so that the arm structures overlap and, similarly, arm structures 67 of the limber 24 are offset and overlap when in closed positions on the tree trunk 100.

The rolls 30 and 32 are identical in construction and only the roll 30 will be described in detail. The rolls 30 and 32 are essentially V-grooved, and each includes two integral frustums 120 having longitudinal V-shaped ribs 122 integral therewith and having sharp corners 124 for biting into the tree trunk. The rolls 30 and 32 have heavy, integral end walls 126 keyed to shafts 128 journaled in bearings 130 bolted to the members 40 and 41. A reversible, geared, hydraulic motor 132 drives a chain 134 through a sprocket 136 to drive sprockets 138 keyed to the shafts 128. When the motor 132 is driven, the ribs 122 advance the tree trunk along the header. When valving to the motor is actuated to close off hydraulic lines 140 and 142 to the motor, the rolls 30 and 32 are locked against rotation and hold the tree trunk against movement longitudinally of the header.

The chain saw 20 (FIGS. 1, 7 and 8) includes a saw bar 150 carried by a motor frame 152 carrying a hydraulic motor 154 and pivotally supported on a pin 156 by a clevislike bracket 158 carried at the lower end of the cradle frame 22 and the header by pins 160 and compression springs 162. A saw chain 164 is mounted on the saw bar and a drive sprocket (not shown) of the motor 154 and is driven by the motor under the control of the operator of the harvester. To fell or to buck, the operator actuates valves (not shown) to drive the motor 154 and extend a hydraulic cylinder 166 from a supply of hydraulic fluid on the tractor. The cylinder 166 swings the saw from its full-line position shown in FIG. 8 to its broken-line position, and the saw as it is so swung fells or bucks the trunk as it is so swung. The cylinder 166 is pivotally attached at one end to the bracket 158 and at its other end to the motor frame 152.

The frame 22 (FIGS. 1, 2, 7 and 9) of the header 24 is attached to the outer end of a jib 180 of the boom 14 by a universal joint 182. An end portion 184 of the jib is connected pivotally by a horizontal pin 186 to a clevis portion of shaft member 188 mounted rotatably by a radial-and-thrust bearing structure on a post 190 fixed rigidly to the cross member 45. Double-acting hydraulic cylinders 192 connected to a bracket 194 and lugs 196 on the shaft member 188 are adapted to adjust the header 12 through a range of about 135° about the longitudinal axis of the shaft member 188 and hold the header in the adjusted position. The pivotal connection between the shaft member 188 and the jib 180 permits adjustment of the header about the pin 186 through an angle of greater than 90° to move the header to any desired position between its vertical felling position and its horizontal limbing and bucking position shown in broken lines in FIG. 1. A double-acting hydraulic cylinder 200 connected to a clevis 202 on the jib and to the bracket 194 effects adjustment of the header about the pin 186 and holds the header in adjusted position.

A double-acting hydraulic cylinder 210 (FIG. 1) connected to a clevis 212 of the jib 180 and to a clevis 214 of a mast 216 of the boom 14 controls the relative angular position of the jib relative to the mast. A double-acting hydraulic cylinder 220 connected to a clevis 222 of the mast 216 and to a clevis post 224 of the swivel structure 18 controls the relative angular position of the mast relative to the clevis post 224.

In its operation to harvest a tree, the harvester 10 is moved up to the tree with the header 12 vertical and the ribbed rolls 30 and 32 engaging the tree. The arm structures 67 of the limbers 23 and 24 then are swung closed to press the trunk against the rolls 30 and 32 which are held against rotation by the motor 132. The chain saw 20 then is started and is swung from its retracted position shown in full lines in FIG. 8 completely through the tree to fell or sever the trunk of the tree from its stump. The header then may be driven by rolls 30 and 32 up the trunk of the tree to a position near its center of gravity and the tree swung downwardly or the header may be turned immediately after felling to swing the tree downwardly without movement of the header up the tree from its initial felling position.

After the tree has been laid down, the rolls 30 and 32 are driven to pull a length of the tree through the header, and the shearing edges 53, 72 and 92 shear off any limbs encountered. When a sufficient length has been advanced therethrough, the motor 132 is stopped and the chain saw 20 is operated to cut through or buck the tree. Another length of the tree is then pulled through the header and limbed and another bucking operation is effected. This is continued until the entire tree is limbed and bucked.

Embodiment of Figures 12 and 13

A tree harvester 211 forming an alternate embodiment of the invention is generally similar to the harvester 10, and a header 213 of the harvester 211 is mounted on a boom 215 by a powered universal joint structure 218 for felling the tree, laying the tree horizontal, limbing the tree and bucking log lengths. Also pressing and guiding limbers 223 of the header 213, which limbers 223 correspond to the limbers 23 and 24 of the header 12, include pairs of arm structures 267. Each arm structure 267 comprises a single curved shear plate 251 carrying rollers 252 and having a shearing edge 253 and operable by a hydraulic cylinder 254 connected to header frame 255 and to the plate 251. Arcuate backing ribs 256 are welded to the plates 251. Each limber 223 also has an arcuate, cradlelike shear plate 260 fixed rigidly to the header frame. Each shear plate 260 has a shearing edge 261 for limbing. Only the upper one of the limbers 223 is shown, it being understood that the lower limber is like the limber 223 and is positioned at the lower end of the frame 221 in positions like those of the limber 24 of the header 12. The limbers 223 are adapted, with ribbed rollers 230 like the rollers 30 and 32, to fully encircle the tree trunk and selectively hold it against longitudinal movement through the header or to pull the tree trunk through the header to limb the tree between bucking operations by a chain saw (not shown) like the chain saw 20 and carried by the header 213. The harvester 211 is adapted to grip a standing tree, fell the tree, turn the tree to a horizontal position, pull the tree through the header to limb it and buck lengths of the tree into logs.

Embodiment of Figures 14—18

A tree harvester 310 forming an alternate embodiment of the invention is generally similar to the harvester 10 and includes a header 312 mounted on a crawler tractor (not shown) by an articulated boom 314 and a powered universal joint structure 318. The header includes a chain saw 320 at the bottom end of a cradle frame 322, upper and lower limbers 323 and 324, and a central tree holding and advancing mechanism 328 including rather closely spaced, centrally located, upper and lower gripping and advancing ribbed rolls 330 and 332 mounted on a resiliently mounted carrier frame 334. A ribbed presser roll 336 carried by a piston rod 327 of a piston in a double-acting pulling cylinder 338 is movable between an open position extending along the tree and gripping position extending across the tree in which an axle 329 mounting the roll 336 is hooked under a hook portion 331 of a piston rod 335 carried by a double-acting pulling cylinder 337. The cylinders 337 and 338 are rigidly mounted on opposite sides of the cradle frame 322. The harvester 310 serves to fell, limb and buck trees, long or short. The harvester moves up to a tree 341, the header 312 grips the tree, the chain saw 320 then severs the tree from its stump, the header and boom lays the tree down, the header intermittently advances the tree along the header and limbs the tree as the tree is so advanced and bucks the tree between advancements of the tree along the header. If desired, instead of laying the tree down immediately after felling, the header can be advanced up the trunk to a point near the center of gravity of the tree before gripping the tree and laying the tree down.

The cradle frame 322 (FIGS. 14, 15 and 16) includes longitudinal channel members 340 to which end cross frame members 342 and 343, central frame members 344 and 345 and an enlarged ground-engaging foot 346 are secured by welding to form a rigid frame structure. Arcuate shearing plates 351 and 352 having spiral shearing edges 353 and 354, respectively, are fixed to the cross frame members 342 and 343. Heavy clevislike brackets 355 are welded to the frame and pivotally mount arms 367 and also pivotally mount hydraulic cylinders 365. The outer ends of the cylinders 364 are pivotally connected to the arms 367. The arms 367 include heavy arcuate shear plates 371 having shearing edges 375 and 376 and also include parallel stiffening plates 379 welded to the backs of the shear plates.

The rolls 330 and 332 (FIGS. 14, 15 and 16) are identical in construction to the rolls 30 and 32 and are driven by a reversible, geared, hydraulic motor 432, which is adapted to drive chains 434 through sprockets 436 to drive sprockets 438 keyed to shafts 428. When the motor 432 is driven, ribs 433 advance the tree trunk along the header. When valving to the motor is actuated to close off hydraulic lines 440 to the motor, the rolls 330 and 332 are locked against rotation and hold the tree trunk against movement longitudinally of the header and against tilting movement relative to the header. The motor 432 is mounted on the carrier frame 334.

The carrier frame 334 (FIGS. 14 and 15) includes a base 441 and pairs of ears 442 journaling the shafts 428. The base 441 is rigidly attached to parallel, supporting, guide rods 443 slidable in bushings 444 mounted in blocks 447 and 451 welded to the members 34 of the frame 322. Strong compression springs 445 on the rods 443 urge the carrier frame 334 in a direction laterally away from the cradle frame 322. Stops 449 pinned to the rods 443 limit movement of the carrier frame 334 away from the cradle frame 322. The springs 445 normally urge the carrier frame 334 to a position in which the stops 449 engage the blocks 447 and 451, in which position the carrier frame holds the rolls 330 and 332 closer to the centerline of the alined limbers 323 and 324 than the rolls 330 and 332 would be when clamping a portion of a tree centered on the centerline of the limbers 323 and 324. This floating support of the carrier frame 334 permits the operator to adjust the positions of the piston rods 327 and 335 to grip the tree and hold it centered relative to the limbers 323 and 324 regardless of whether the portion of the tree extending between the limbers is bowed toward the cradle frame 322 or bowed away from the cradle frame. This, plus positioning of the limbers 323 and 324 in loosely encircling positions prevents slabbing of the tree by the limbers. The roll 336 is V-grooved and ribbed, and is similar to the rolls 330 and 332 so as to engage the tree trunk tangentially and form essentially a three point gripping mechanism with the rolls 330 and 332.

The piston rod 327 is adapted to move the roll 336 between an open, retracted position shown in dotted lines in FIG. 15 in which the roll 336 is in the projected area of the rolls 330 and 332, an extended open position shown in broken lines in FIG. 15, with the piston rod 335 extended, and a closed, pressing position holding the tree trunk against the rolls 330 and 332 to grip the trunk and hold it stationary if the motor 432 is stopped or move the trunk along the cradle frame 322 when the motor is operated. The carrier frame 334 is adapted to float back and forth laterally relative to the cradle frame 322 to accommodate bends in the trunk of the tree and still keep the tree centered between the upper and lower limbing devices. The motor 432 is reversible to drive the tree trunk in either direction along the header 312.

The piston rod 327 and its piston are rotatable in the cylinder 338 to move the roll 336 between its open position extending longitudinally of the cradle frame 322 and its closed position extending across the frame 322 and in which the axle 329 is in the hooked end portion of the piston rod 335. To turn the piston rod 327, a hydraulic motor 401 is actuated to rotate a gear segment 403 of a sleeve 405 mounted rotatably on the cylinder 338 between the thrust collars 407 fixed to the cylinder 338. When the sleeve 405 is turned, it turns a splining rod 409 slidable in alined bores in ears 411 of the sleeve and the splining rod turns the piston rod 327 through an arm 413 rigidly connected to the piston rod 327 and slightly loosely connected to the rod 409 through a clevis joint 415. These elements form an external spline and rotating mechanism to position the roller 336 under the control of the motor 401.

The spiral serrated or toothed, shearing edges 353 and 375 easily shear the limbs with a slicing action. The spiral, unserrated shearing edges 354 and 376 of the arms 371 of the limber 324 shear limbs below the limber 323. The operator actuates the hydraulic cylinders 365 to position the arms 367 to somewhat closely but loosely encircle the trunk of the tree. As the tree is moved through the header and the diameters of the portions of the trunk encircled by the arms get larger or smaller, the operator, from time to time, actuates valves (not shown) in the hydraulic lines (not shown) to the cylinders to further close or further open the arms to keep the arms 367 closely but loosely encircling the trunk. The supply of hydraulic liquid to the cylinders 337 and 338 holds the pistons 327 and 335 in the cylinders 337 and 338 equally extended or equally retracted and, with the floating frame 334, cause the presser roll and the rolls 330 and 332 to strongly grip the tree while also being moved toward and away from the cradle frame 322 to accommodate bows in the trunk.

Embodiment of Figures 19—21

A tree harvester 510 forming an alternate embodiment of the invention is generally similar to the harvester 310 and includes a header 512 mounted on a crawler tractor (not shown) by an articulated boom 514 and a powered universal joint structure 518. The header includes a chain saw 520 at the bottom end of a cradle frame 522, an upper limber 523, and a lower tree holding and advancing mechanism 528 including rather closely spaced, centrally located, upper and lower gripping and advancing ribbed rolls 530 and 532 mounted on a resiliently mounted carrier frame 534 mounted like the frame 334. A ribbed presser roll 536 carried by a rod 527 is movable between an open position extending along a tree 541 and a gripping position extending across the tree.

The rod 527 is slidable in a tubular arm 543 of a U-shaped frame 545 having a second arm 547 and a bridge 549. Bar portions 551 (FIG. 21) on the arms 543 and 547 are slidable in parallel guideways 553 fixed rigidly to the cradle frame 522. The U-shaped frame 545 is movable transversely of the cradle frame 522 by a double-acting hydraulic cylinder 555 connected to the U-shaped frame and a bar 557 rigidly connected to channels 540 of the cradle frame 522. The rod 527 has a pin 559 which projects into longitudinally extending splining slots 567 in the tubular arm 543 and holds the rod 527 in a position holding the presser roll 536 in its open position while the rod 527 is moved along the tubular arm 543 by a spirally slotted driving sleeve 568 rotated by a hydraulic motor 569 on the U-shaped frame 545 and a chain drive 573. When the rod 527 reaches its extreme extended position, the pin 559 moves out of the splining slots 562 into arcuate end slots 575 and the sleeve 568 rotates the rod 527 90° to swing the roll 536 to its closed position and swing axle 552 mounting the roll 536 into a hooked end 531 and a rod 539. The rod 539 is splined in and movable into and out of the tubular arm 547 by a spirally slotted sleeve (not shown) like the sleeve 568, a pin (not shown) like the pin 559 and slots (not shown) like the slots 562. The sleeve in the arm 547 is rotated by the motor 569 through a chain drive 581 at the same speed as the sleeve 568 and moves the rod 539 at the same rate of speed as that of the rod 527 to keep the hooked end portion 531 and the outer end of the rod 527 laterally alined. The arm 547 does not have arcuate slots like the slots 575 so that the rod 539 always is kept from rotating and the hooked end portion is kept open.

The harvester 510 serves to fell, limb and buck trees, long or short. The harvester moves up to the tree 541, the header 512 grips the tree, the chain saw 520 then severs the tree from its stump, the header and boom lays the tree down, the header intermittently advances the tree along the header and limbs the tree as the tree is so advanced and bucks the tree between advancements of the tree along the header. If desired, instead of laying the tree down immediately after felling, the header can be advanced up the trunk to a point near the center of gravity of the tree before gripping the tree and laying the tree down.

The cradle frame 522 is similar to the frame 322 except that the mechanism 528 is mounted near the lower end of the cradle frame. The limber 523 is identical to the limber 323.

The rolls 530 and 532 are identical in construction to the rolls 30 and 32 and are driven by a reversible, geared hydraulic motor 632, which is adapted to drive chains 634 through sprockets 636 to drive sprockets 638 keyed to shafts 628. When the motor 632 is driven, ribs 633 advance the tree trunk along the header. When valving to the motor is actuated to close off hydraulic lines 640 to the motor, the rolls 530 and 532 are locked against rotation and hold the tree trunk against movement longitudinally of the header. The motor 632 is mounted on the carrier frame 534, as are the rolls 530 and 532.

The rod 527 is adapted to move the roll 536 between an open, retracted position in which the roll 536 is in the projected area of the rolls 530 and 532, an extended open position, and a closed, pressing position holding the tree trunk against the rolls 530 and 532 to grip the trunk and hold it stationary if the motor 632 is stopped or move the trunk along the cradle frame 522 when the motor is operated. The carrier frame 534 is adapted to float back and forth laterally relative to the cradle frame 522 to accommodate bends in the trunk of the tree and still keep the tree centered in the upper limber 523. The motor 632 is reversible to drive the tree trunk in either direction along the header 612.

The above-described harvesters 10, 211, 310 and 510 simply and conveniently fell, limb and buck trees without requiring clamps per se but rather with a steady rest type of clamping and feeding. The harvesters are of light weight, are capable of processing long or short logs, can feed the headers 12, 212, 312 and 512 up trees to grip the trees at their centers of gravity and with simplicity of feeding the trees through the headers, only one control being necessary to feed the tree through one of the headers after the tree is grasped by the header.

I claim:
1. In a tree harvester:
an elongated header frame adapted to be moved to a position extending vertically along a trunk of a tree;
limb-shearing means mounted on the upper end of the frame;
endless conveying means mounted on the frame below the limb-shearing means and having projecting elements for engaging the trunk of the tree and for travel longitudinally of the trunk;
pressing means for pressing the trunk of the tree against the projecting elements to grip the trunk with the projecting elements and for permitting travel of the trunk therepast; and
drive means for driving the endless conveying means to move the frame along the trunk.

2. The tree harvester of claim 1 wherein the endless conveying means comprises roller means.

3. The tree harvester of claim 2 wherein the endless conveying means includes a grooved ribbed roller.

4. The tree harvester of claim 2 wherein the endless conveying means includes a V-groove ribbed roller.

5. The tree harvester of claim 2 wherein the endless conveying means comprises a pair of parallel rollers having doglike projections and extending across the frame.

6. The tree harvester of claim 5 wherein the pressing means is adapted to engage the side of the trunk opposite the rollers and pull the rollers against the trunk.

7. The tree harvester of claim 6 wherein the rollers and the pressing means are mounted on the lower end portion of the frame.

8. The tree harvester of claim 6 wherein the rollers and the pressing means are mounted on the central portion of the frame.

9. The tree harvester of claim 6 wherein the pressing means comprises the limb-shearing means.

10. The tree harvester of claim 6 wherein the pressing means is independent of the limb-shearing means.

11. The tree harvester of claim 6 wherein the pressing means is movable between an open position permitting the conveying means to be moved into engagement with the trunk and an operative position holding the trunk against the conveying means.

12. The tree harvester of claim 11 including floating frame means resiliently mounting the conveying means on the frame.

13. The tree harvester of claim 1 including cutting means on the bottom end portion of the frame for felling and bucking the tree.

14. The tree harvester of claim 13 wherein the cutting means comprises a chain saw.

15. The tree harvester of claim 1 wherein the limb-shearing means includes trunk-encircling arms adapted to press the trunk against the conveying means and movable along the trunk, the arms also including shearing blade portions for shearing limbs.

16. The tree harvester of claim 15 wherein the trunk-encircling arms have inwardly projecting members for engaging the trunk to space the shearing blade portions outwardly from the trunk.

17. The tree harvester of claim 16 wherein the projecting members are rollers.

18. The tree harvester of claim 1 wherein the limb-shearing means comprises an arcuate shearing member fixed to the frame and having an upper shearing edge, and arcuate shearing means having an upper shearing edge adapted, with the shearing member, to fully encircle the trunk of the tree and movably mounted on the frame between open and closed conditions.

19. The tree harvester of claim 18 wherein the arcuate shearing means includes an arm carrying a shear plate and pivotally mounted on the frame, and a cylinder device for swinging the arm between open and closed position.

20. The tree harvester of claim 18 wherein the arcuate shearing means comprises a pair of vertically offset arms pivotal on the frame and carrying a pair of shearing plates and means for swinging the arms away from each other to open positions and toward each other to trunk-encircling positions.

21. The tree harvester of claim 18 wherein the shearing edges are serrated.

22. In a tree harvester:
elongated frame means;
limb-shearing means mounted on one end of the frame means;
a trunk gripping and advancing unit including endless conveying means having projections adapted to engage a trunk of a tree; and
mounting means mounting the trunk gripping and advancing unit on the frame means for movement in a position spaced along the frame means from the limb-shearing means and for movement laterally of the frame means and the limb-shearing means to compensate for bends in the trunk.

23. The tree harvester of claim 22 wherein the limb-shearing means comprises fixed shear means and arm means carrying shear blade means for loosely encircling the trunk with the fixed shear means.

24. The tree harvester of claim 22 wherein the trunk gripping and advancing unit includes a drive roll having projections adapted to bite into the trunk and pressing means adapted to press the trunk against the drive roll.

25. The tree harvester of claim 24 wherein one of the drive roll and the pressing means is a grooved roll.

26. The tree harvester of claim 25 wherein the drive roll is grooved.

27. The tree harvester of claim 22 wherein the mounting means includes a carrier frame supporting the endless conveying means, means mounting the carrier frame on the frame means for movement toward and away from the frame.

28. The tree harvester of claim 22 wherein the unit includes pressing means, the mounting means also including pulling means for pulling the pressing means toward the frame means to press the trunk against the conveying means.

29. The tree harvester of claim 28 wherein the pulling means includes a rod mounting the pressing means and adapted to swing the pressing means between an open position extending along a side of the frame means and an operative position extending across the frame means and the trunk and to pull the pressing means toward the frame means.

30. The tree harvester of claim 29 wherein the pulling means is positioned at said side of the frame means, and a second pulling means mounted at the other side of the frame means and adapted to detachably engage the pressing means when the pressing means is in said operative position.

31. The tree harvester of claim 30 wherein the pulling devices comprise hydraulic cylinder drives.

32. The tree harvester of claim 30 wherein the pulling devices comprise pin-and-slot drives.

33. The tree harvester of claim 30 wherein the pulling devices include a U-shaped frame, guideways on the sides of frame means mounting the U-shaped frame slidably on the frame means, and a cylinder drive for sliding the U-shaped frame along the guideways.

34. In a tree harvester:
a frame;
a pair of grooved drive rolls having projecting drive elements and mounted on the frame;
drive means for rotating the drive rolls;
L-shaped pressing means having a shank portion and a transverse pressing portion;
means on one side of the frame mounting the shank portion slidably transversely of the frame; and
means for moving the pressing means toward and away from the frame and for turning the pressing means about the shank portion between an open position in which the pressing portion extends along said one side of the frame and a closed position in which the pressing portion extends across the frame.

35. The tree harvester of claim 34 including hook means, means on the other side of the frame from said one side thereof for positioning the hook means to hook the pressing portion when the pressing portion is in its closed position and for pulling the pressing means toward the frame.